(No Model.)  5 Sheets—Sheet 1.
C. E. TILTON.
TYPE WRITING MACHINE.

No. 306,295.  Patented Oct. 7, 1884.

WITNESSES  
C. H. Arnold  
Jas. Greene

INVENTOR  
C. E. Tilton  
BY J. J. Arnold  
ATTORNEY (No Model.)

C. E. TILTON.

TYPE WRITING MACHINE.

No. 306,295.  Patented Oct. 7, 1884.

5 Sheets—Sheet 2.

Fig. 4.ᵃ

WITNESSES
C. H. Arnold
Jas. Greene

INVENTOR
C. E. Tilton
BY J. G. Arnold
ATTORNEY (No Model.)  5 Sheets—Sheet 3.

C. E. TILTON.
TYPE WRITING MACHINE.

No. 306,295. Patented Oct. 7, 1884.

WITNESSES
C. H. Arnold
Jas. Greene

INVENTOR
C. E. Tilton
BY J. J. Arnold
ATTORNEY (No Model.)  C. E. TILTON.  5 Sheets—Sheet 4.
TYPE WRITING MACHINE.

No. 306,295. Patented Oct. 7, 1884.

WITNESSES
C. H. Arnold
Jas. Greene

INVENTOR
C. E. Tilton
BY J. G. Arnold
ATTORNEY (No Model.)　　　　　　　C. E. TILTON.　　　　　5 Sheets—Sheet 5.

TYPE WRITING MACHINE.

No. 306,295.　　　　　　　　　Patented Oct. 7, 1884.

UNITED STATES PATENT OFFICE.

CHARLES E. TILTON, OF WORCESTER, MASSACHUSETTS.

TYPE-WRITING MACHINE.

SPECIFICATION forming part of Letters Patent No. 306,295, dated October 7, 1884.

Application filed August 4, 1883. (No model.)

*To all whom it may concern:*

Be it known that I, CHARLES E. TILTON, of the city and county of Worcester, and State of Massachusetts, have invented a new Type-Writer, of which the following is a specification.

My invention is designed to produce a machine capable of being easily and rapidly operated, and of simple and durable construction. Its nature consists, mainly, of two independent slides suitably supported over the paper by three rods or a frame, one of said slides being provided with a device for giving it a stepping or spacing movement, and a weight or other suitable motive power, and carrying an index or letter-board and impression-lever to act on any of the type carried by the other slide, the depression of said lever operating said stepping mechanism preparatory for a step or space, the slide thus automatically moving when the impression-lever is raised, and being then locked in position until another step is to be made. This stepping and index slide carries a protecting-guard over the ink-ribbon and paper, having an opening in its central part under the impression-lever, through which the types operate. The other slide, carrying the type, which are arranged to slide freely through it, is provided with pointing-lever, having one or more pressure-buttons, by means of which the operator gives the impression to each letter, as indicated by the pointer. The paper is laid on a bed beneath the rods, and over it is placed the ink-ribbon, with a slotted protector to hold it off the paper, except where the impression or print is made.

Figure 1:
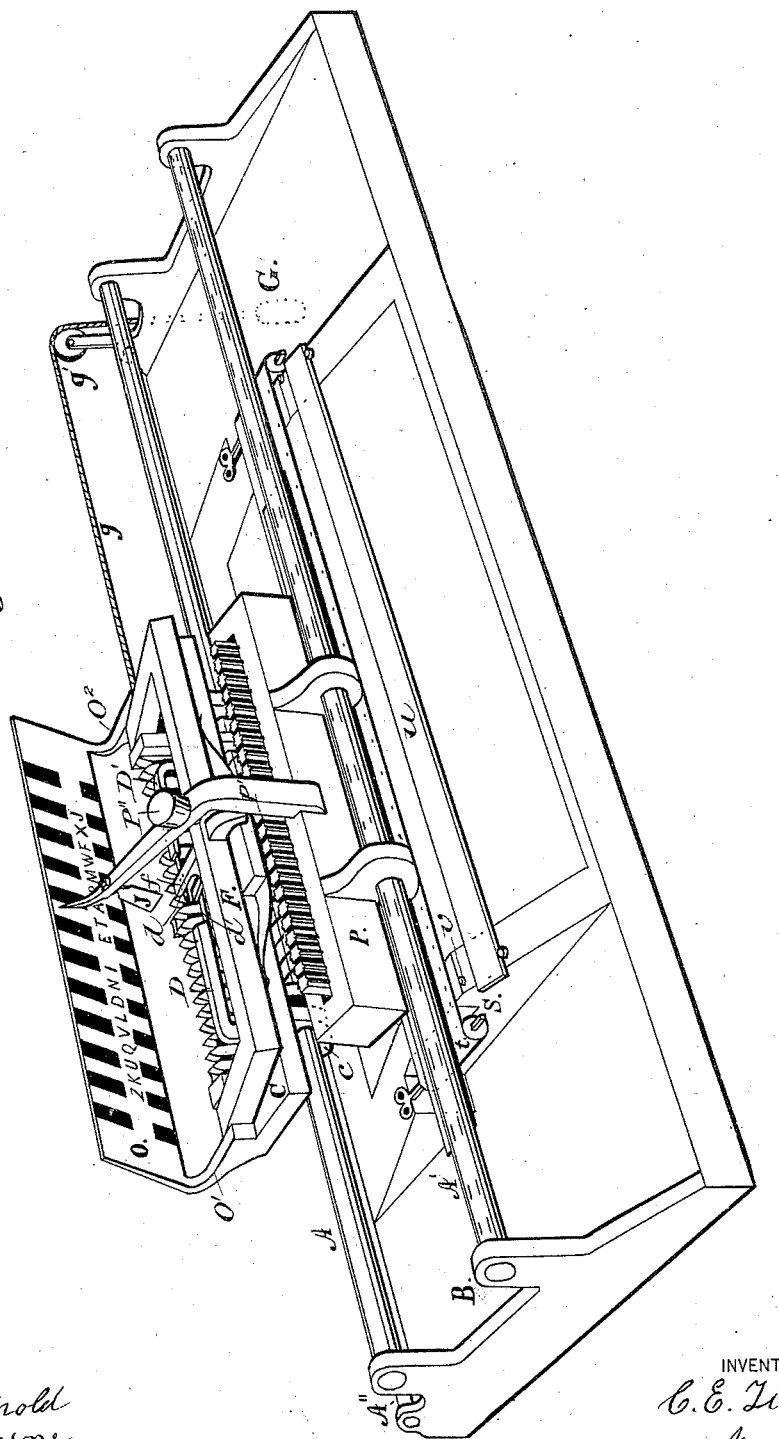
Figure 2:
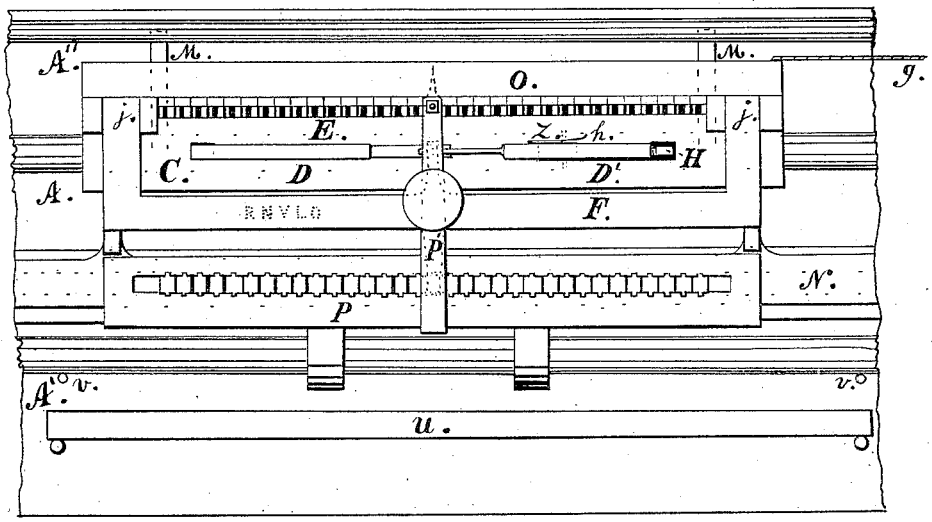
Figure 3:
Figure 3:
Figure 4:
Figure 4:
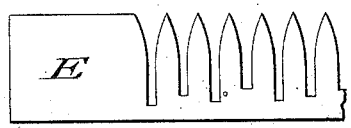
Figure 5:
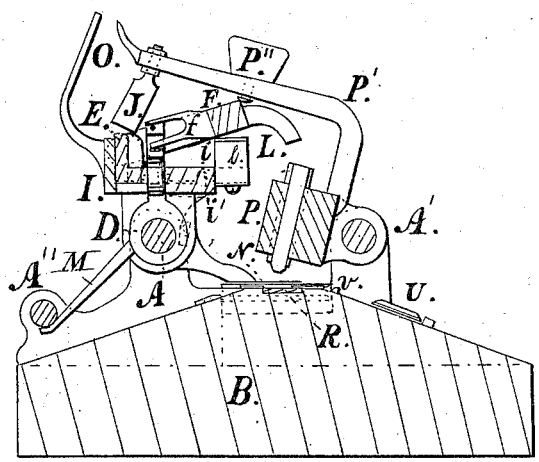
Figure 6:
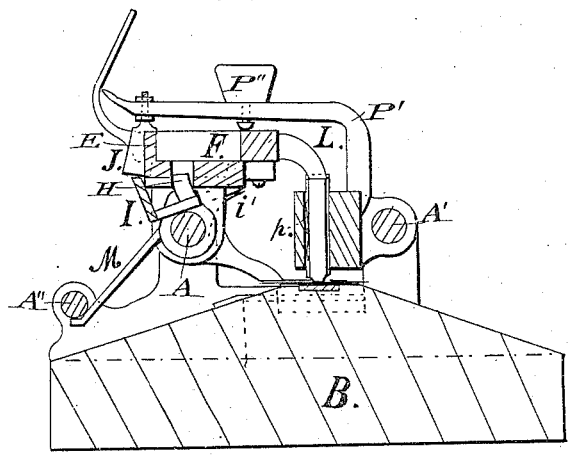
Figure 7:
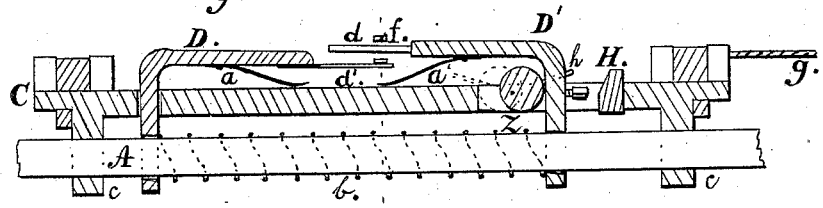
Figure 8:
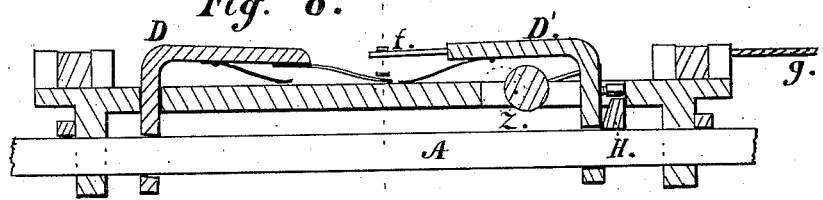
Figure 9:
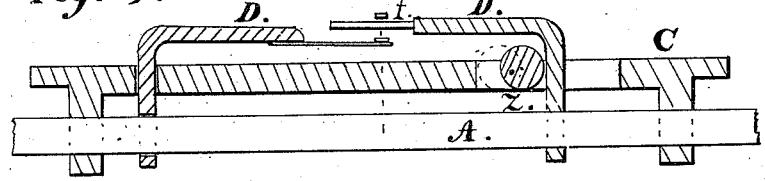
Figure 10:
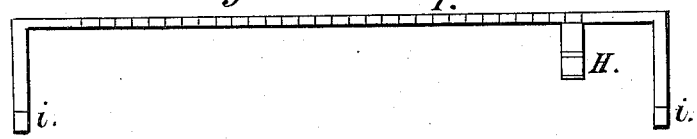
Figure 11:
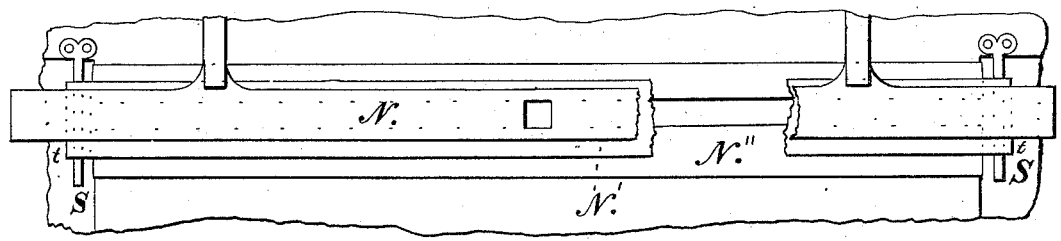
Figure 12:
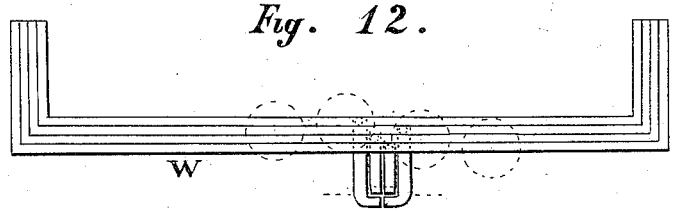
Figure 13:
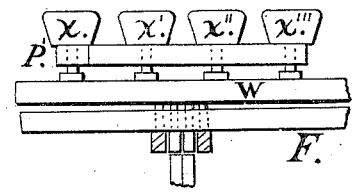

In the accompanying drawings, Figure 1, Sheet 1, is a perspective view of a type-writer embodying my invention. Fig. 2, Sheet 2, is a plan of the operating parts and central portion of the bed. Fig. 3, Sheet 2, is a front view of the index or letter-board. Fig. 4, Sheet 2, shows a back view of parts of the slide and spacing-lever. Fig. 4$^a$ shows a part of the piece E enlarged, and the variation of the depth of the division greatly exaggerated. Fig. 5, Sheet 3, shows a cross-section of Fig. 2 near the center, as seen from the left, with the parts in position to move to any letter or space. Fig. 6, Sheet 3, shows the same with the parts in position as giving an impression or printing. Fig. 7, Sheet 4, is a central longitudinal section of the stepping-slide on its rod. Fig. 8, Sheet 4, is the same with a step partly or ready to be taken. Fig. 9, Sheet 4, the same with the step completed. Fig. 10, Sheet 4, is a plan of the spacing-lever. Fig. 11, Sheet 5, is a plan of the ink-ribbon and its guards. Fig. 12, Sheet 5, shows an arrangement or adaptation to a multiple or shorthand system. Figs. 13, 14, 15, and 16, Sheet 5, show other parts of the same, hereinafter more particularly described.

The same letter indicates the same part wherever it occurs in any drawing.

A A' are two rods of hard metal, preferably steel, supported from the base B. The rod A holds the slide C, which moves on it by a stepping or spacing motion, produced by the two dogs or clamps D D', as shown in Figs. 5 to 9, inclusive, and the cord and weight $g$ G, Fig. 1. The slide C has two arms or lugs, $c$ $c$, through which the rod A passes.

D D' are the stepping dogs or clamps, made of steel and hardened, and fitted to slide freely when straight on the rod, and to bind or grip the rod when inclined or tipped. Their upper parts, passing up through apertures in the slide C, are turned or bent at right angles, or nearly so, toward each other, one ending in a small stiff rod, $d$, and the other having a spring, $d'$, attached, both extending under the fork $f$, and each having a spring, $a$ $a'$, pressing against the surface of C, and tending to raise the ends of the dogs. The dog D, when held up by its spring, as in Fig. 7, is free to slide on the rod A; but when its end is depressed by the fork $f$, as in Fig. 8, it binds with a firm hold on the rod; but the other dog, D', when held up by its spring, binds and holds firmly on the rod, and when its end $d$ is depressed by the fork $f$, as in Fig. 8, can be moved by the coiled spring $b$ (between the two dogs on the rod A) the length of its opening in the slide C. At $g$ is a cord passing over the pulley $g'$ and attached to the weight G, the other end being secured to the slide C. These parts constitute the stepping or spacing mechanism, operating by the pressing down of the adjacent ends of the dogs D D' by the fork $f$ and their rise when released. Thus, as the fork $f$ descends, its lower branch, hitting the spring of D, forces it down, thus gripping the bar A firmly before the other branch of the fork $f$ has moved the other dog, D', enough to release it, and the spring of D yielding as the fork moves down, that dog holds and the other is released, and is moved by the coiled spring $b$ along the rod from the other as much as the space in C, through which it passes, will allow, as shown in Fig. 8. On the rise of the fork $f$, the dog D' being the first relieved, its spring $a'$ causes it to bind and clamp the rod A before the other dog, D, relinquishes its hold, and as the fork rises higher the dog D is released, its spring raises it free, and the weight G draws the slide C along the rod A, carrying the dog D with it till stopped by the dog D', (the force of the weight overcoming the coiled spring,) thus making a step, as shown by Fig. 9. The repeated movements of fork $f$, which are given by the operation of printing each impression, cause the slide C to slide step by step along the rod A across the paper.

It will be seen from the nature of the grip of the dogs that any pressure on the slide C opposite and sufficient to overcome the weight G will push the slide C to the left, as the dog D' holds only against any motion in the other direction. This motion to the left (or back after each line is printed) is done by the hand of the operator, who at the same time with the other hand moves the paper by the rubber-faced rule $u$ by sliding it up to the stops $v\,v$ all ready for the next line.

In the opening in C through which the dog D' passes are put the spacing-adjusters, consisting of the eccentric Z on one side, which, by means of its lever $h$, may be turned to the position shown in broken lines in Figs. 7, 8, and 9, and will stay as set in any position, giving the desired length of step or standard space alike for all, and on the other side of D' the differential or variable adjuster H, against the inclined side of which the screw or projection of D' stops. The wedge H is attached to the lever I, by which it is held and adjusted for each letter. This lever I, Fig. 10, is pivoted at $i$, Fig. 5, and is held up against the back of C by the spring $i'$, as in Fig. 5, except when pressed down by the leader J, when it takes the wedge H down with it, as in Fig. 6. The surface of this lever I, a back view of which is shown in Fig. 4, is arranged to give the right variation of space for each letter by the height of the notch under the leader J for each letter, making an automatic adjustment for each letter printed. The fork $f$ is attached to the bar F, whose ends extend back at right angles, and are pivoted at $j\,j$ to the slide C, the bar F having a projection, L, in front, extending out to press down each type, forming the impression-lever. The raised edge E on the back of slide C is divided into equal spaces with those occupied by the type in the other slide, as shown in Fig. 4, into which the leader J enters at each pressure, the depth of each notch governing the impression for each letter. The larger the letter the more pressure required, which is given by the deeper notch.

Under the bar F is a spring, $l$, attached to a projection on the slide C to raise the bar and lever L off the type, and to the lugs of the slide are attached the two stiff arms or guards M M, which extend out and down, so that their ends rest under the rod A'', regulating the amount of motion of the slide C around the rod A by the lever L; and the lugs in front are brought out and support the upper guard, N, which they carry just over the ink-ribbon N', an opening in the center of the guard under the impression-lever L allowing the type to reach the ink-ribbon and print. The other type, if projecting, rest on the guard without touching the ribbon or paper.

Over the back of the slide C is the index O, supported by the arms O' O''. This is divided into three parts longitudinally, the middle one clear to be filled with the letters or characters used, with divisions for each corresponding to the type and other divisions, and the other divisions similarly spaced and alternately colored, Fig. 3. These assist the eye of the operator in placing the pointer quickly over any letter desired, the index being placed near the path of the pointer, as shown.

On the rod A' slides the type-carrier P, sliding and turning freely, so as to be easily and quickly moved by the hand of the operator, who takes its arm P' between the thumb and fingers, with a finger resting on the press-button P'', the type-carrier being spaced to agree with the index O and the divisions in the plate E on the slide C, and provided with grooves to receive the ribs on the type, as shown, a slight spring, $p$, Fig. 6, giving them sufficient friction to hold them as placed.

In putting the type into the carrier P, beginning at the center, (which I prefer to leave as a blank space,) they are placed in the opposite order from the index—that is, the type on the left of the center agree with the letters on the right of the index, and vice versa, so that when the pointer on the end of the arm P' is in front or over any letter on the index the same letter or type is brought under the printing-lever L, ready to print, and each letter is so placed on its type that its left side (of the letter) shall be in the same position as that of all the others in relation to the printing-lever.

Under the button P'' is a rounded projection or cam to press down the bar F for any of the letters. The leader J is adjustable near the end of the lever P', its lower end fitting easily between the divisions E when pressed down, its screw and nuts on each side of P' making it easily adjusted to give the best impression by the lever L. The bed or table B (shown in cross-section in Figs. 5 and 6) has its middle raised, and along its center is inserted the strip of rubber R, or other suitable material to print on, over which the paper is laid. Above the paper is first the guard N'', slotted its length or clear across the paper. This protects the paper from the ink-ribbon, which is placed over it; yet when any type is pressed down it carries the ink-ribbon down through the slot enough to print. The ink-ribbon is held in place by its ends, which are fast or rolled on the rolls $t\ t$, which are made with square holes fitting on the studs $s\ s$, their square holes enabling the ribbon to be put in as tight as desirable, and to shift or replace when needed. Close above the ribbon is the upper guard, N, on the slide C.

In operating the machine, the paper having been put in place, the type-slide P is guided to indicate the desired letter by its pointer on the index; then, as the arm P′ is pressed down, the leader J, falling into the space in E, is guided by its sloping sides to the middle, if not exactly there, controlling accurately the position of the type under the lever L, the cam under the button P″ pressing the bar F and its lever L down until the type presses the ribbon onto the paper, printing the letter. Meanwhile the leader has depressed the lever I, if needed, and adjusted the wedge H, and the dog D′ has moved up to it the exact space to be given for that letter, and as the pressure is removed and the parts raised the slide C moves its step with all its attachments and is ready for the next. When a word is printed, the pointer being brought to the middle of the index and pressure given, a step is made without printing or a space, and when stops or punctuation are used a space may be made with each.

To adapt this machine for the use of the blind, the raised or depressed letters are placed on the bar F, (as in Fig. 2, R N V L,) and the index and pointer may be omitted, as with one finger resting lightly on the bar F the slide P can be quickly brought to position accurately, and, if desired, a short arm or pointer may be put on the side of P′ to assist the finger.

Figure 14:
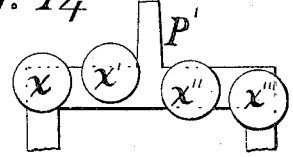
Figure 15:
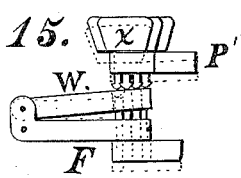
Figure 16:

In Fig. 12 is shown a modification of the bar F, to adapt it to the group system, as shown in Fig. 16, for short-hand or cipher printing. It consists of a number of bars equal to the number of elements in a group, each provided with a lever or arm extending out and over its corresponding member of the group, so that one or more of the members of the group can be forced down and printed. These are pivoted on the bar F, so that their surfaces may be acted on by cams on the arm P′, which is made with a bar, as shown in Fig. 14, making room for the four buttons X X′ X″ X‴ instead of the one P″. These are all arranged on pins passing through the bar P′, and terminating in cams adapted to operate each on its own part of the bars W, as shown in Fig. 14, each pin being long enough and free in its bar, allowing any button to be used without the others, which may be held up by slight springs on the bar F or divisions of its spring. Thus any one element or a combination of any or all of one group (each element of which should represent a syllable at least) may be printed at once, making the machine multipotent and capable of very rapid printing.

Having thus fully described my invention, what I claim therein as new and desire to patent is—

1. In a type-writer, the type-slide provided with its independent type in a line parallel to its line of motion, and an operating-lever, in combination with another slide provided with means, substantially as described, of printing by pressure on the type, and for giving the slide a step-by-step motion over the paper, both capable of being operated at the same time through the motion of said operating-lever.

2. The step-motion mechanism described, consisting of the slide C, adapted to move on a smooth rod or way, A, and the friction-dogs D D, alternately gripping and releasing the smooth rod, substantially as described, and all arranged to be operated substantially as above described.

3. In a type-writer, the stepping mechanism, substantially as described, in combination with the differential spacing mechanism described, consisting of the wedge H and means, substantially as described, for varying its position to give the exact space desired for each letter, substantially as set forth.

4. In a type-writer, the type-slide having a lever or arm by which the machine is operated, in combination with another slide carrying a stepping mechanism and a means for giving impression to the type, all substantially as above set forth.

5. In a type-writer, the type-slide having a lever or arm by which the machine is operated, in combination with a slide provided with a stepping mechanism, a means for giving impression to the type, and means, substantially as described, for controlling by the stepping-slide the position of the type-slide over the paper, substantially in the manner and for the purposes described.

6. In a type-writer having its type or characters in groups, a correspondingly-divided impression-lever over the group, each part moving with the rest a part of their motion, but not giving a printing impression on the type unless specially pressed.

7. In a type-writer printing two or more characters at a time, the series of parallel bars W with impression-levers, in combination with a pressure button or key for each, controlling their position in printing.

CHARLES E. TILTON.

Witnesses:
H. D. SISSON, Jr.,
JAS. G. ARNOLD.